United States Patent [19]

Tichenor

[11] E Re. 30,119

[45] Reissued Oct. 16, 1979

[54] COMPACT FOLLOW SPOT

[75] Inventor: Clyde L. Tichenor, Van Nuys, Calif.

[73] Assignee: Berkey-Colortran, Inc., Burbank, Calif.

[21] Appl. No.: 741,070

[22] Filed: Nov. 11, 1976

Related U.S. Patent Documents

Reissue of:

[64] Patent No.: 3,900,726
Issued: Aug. 19, 1975
Appl. No.: 464,133
Filed: Apr. 25, 1974

[51] Int. Cl.[2] ..... F21V 7/00

[52] U.S. Cl. ..... 362/1; 362/269; 362/299

[58] Field of Search ..... 240/41.35 R, 41.35 C, 240/41 R, 41.1, 41 A, 47, 3, 3.1; 313/113, 114; 362/1, 269, 299

[56] References Cited

U.S. PATENT DOCUMENTS

| | | | |
|---|---|---|---|
| 1,694,485 | 12/1928 | Newland et al. | 240/41.1 |
| 2,950,382 | 8/1960 | Hatch | 240/3.1 |
| 3,038,372 | 6/1962 | Lessman | 240/41.35 R |
| 3,578,965 | 5/1971 | Tawil et al. | 240/41.35 R |

*Primary Examiner*—Peter A. Nelson
*Attorney, Agent, or Firm*—Neuman, Williams, Anderson & Olson

[57] ABSTRACT

A theatrical follow spot utilizes elliptic reflective optics to achieve compact size and non-astigmatic projection. A source lamp is situated in front of the mirror, sufficiently offset to one side thereof so as to be out of the path of reflected light. The mirror has the shape of an ellipsoid of revolution, the mirror section being entirely on one side of a meridian plane of the ellipsoid. The axis of light from the source lamp is coincident with a line through the near focus of the ellipsoid and the center of the mirror. This insures that an image in the near focal plane, such as the circular opening of an iris, will be projected at the distant focal plane of the ellipsoid, without distortion of shape.

32 Claims, 5 Drawing Figures

COMPACT FOLLOW SPOT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to stage lighting and particularly to a compact follow spotlight for stage lighting applications.

2. Description of the Prior Art

A follow spot is used to achieve the special stage lighting effect wherein an actor is illuminated by a circle of light which follows him as he moves about the stage. In a conventional follow spot, a high intensity lamp with a rear reflector is projected through a pattern matte and/or an iris and through a lens that focuses a distant image of the pattern or iris on the stage. Iris adjustment permits variation of the iris image size. The spot housing is mounted to pivot both horizontally and vertically, thereby permitting the operator to move the spotlight so as to follow the actor.

Certain shortcomings are characteristics of prior art follow spots. First, the optical arrangement necessitates a relatively long housing. For example, a typical follow spot having a 75 foot throw has a housing almost 3½ feet long. Installation in small quarters is impossible. A principal object of the present invention is to provide a compact follow spot which is significantly shorter, typically one-half the length of the prior art devices.

Another shortcoming of known follow spots relates to heat entrapment. When a conventional follow spot is tilted downwardly toward the stage, some heat from the lamp is trapped between the lamp and its reflector. The resultant temperature increase may shorten the lamp lifetime. Another object of the present invention is to provide a follow spot in which such heat entrapment does not occur, and in which natural draft venting takes place with downward tilting of the housing.

A further problem is that the refracting lenses in prior art devices may introduce both light loss and chromatic aberration. An object of this invention is to provide a follow spot that is achromatic and substantially free of light loss.

One prior art attempt to overcome these shortcomings placed the light source behind a spherical or parabolic main mirror having a central hole. Light projects forwardly through the hole, is reflected back to the main mirror by a convex mirror in front, and finally is reflected toward the stage by the parabolic mirror. Such an arrangement is shown, e.g., in the U.S. Pat. No. 2,755,374 to Ott and Oberholzer. Reflective optics minimize light loss and are achromatic, but the amount of light projected is limited by the central hole size, and the coaxial alignment of mirrors and light source does not minimize the light loss.

An off-axis reflective organization for use in an automobile headlight is suggested by the British patent No. 399,121 (1933). This device utilizes a paraboloid reflector which produces an unfocused light beam of diverging shape when illuminated by an off-axis source lamp. The beam includes both parallel rays produced by reflection of light from the lamp that passes through the focus of the paraboloid, and offset or diverging rays resultant from light situated slightly outside the focus.

Such an unfocused beam is totally unsatisfactory for follow spot theatrical lighting applications.

SUMMARY OF THE INVENTION

In accordance with the present invention, the foregoing objectives are achieved by providing a follow spotlight in which the light source is situated in front of an elliptic mirror, sufficiently offset to one side thereof so as to be out of the path of reflected light. The mirror has the shape of an ellipsoid of revolution, the mirror section being entirely on one side of a meridian plane of the ellipsoid.

The axis of light from the lamp source passes through the near focus of the ellipsoid. An iris and/or a pattern mask is interposed in this light path at the near focal plane. The elliptic mirror projects a focused image of the iris or mask opening at the distant focal plane of the ellipsoid. Astigmatism is minimized. No chromatic aberration is introduced by the mirror, which is the single reflective surface in the spotlight optical system.

BRIEF DESCRIPTION OF THE DRAWINGS

A detailed description of the invention will be made with reference to the accompanying drawings wherein like numerals designate corresponding elements in the several figures.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention best is defined by the appended claims.

Figure 1:
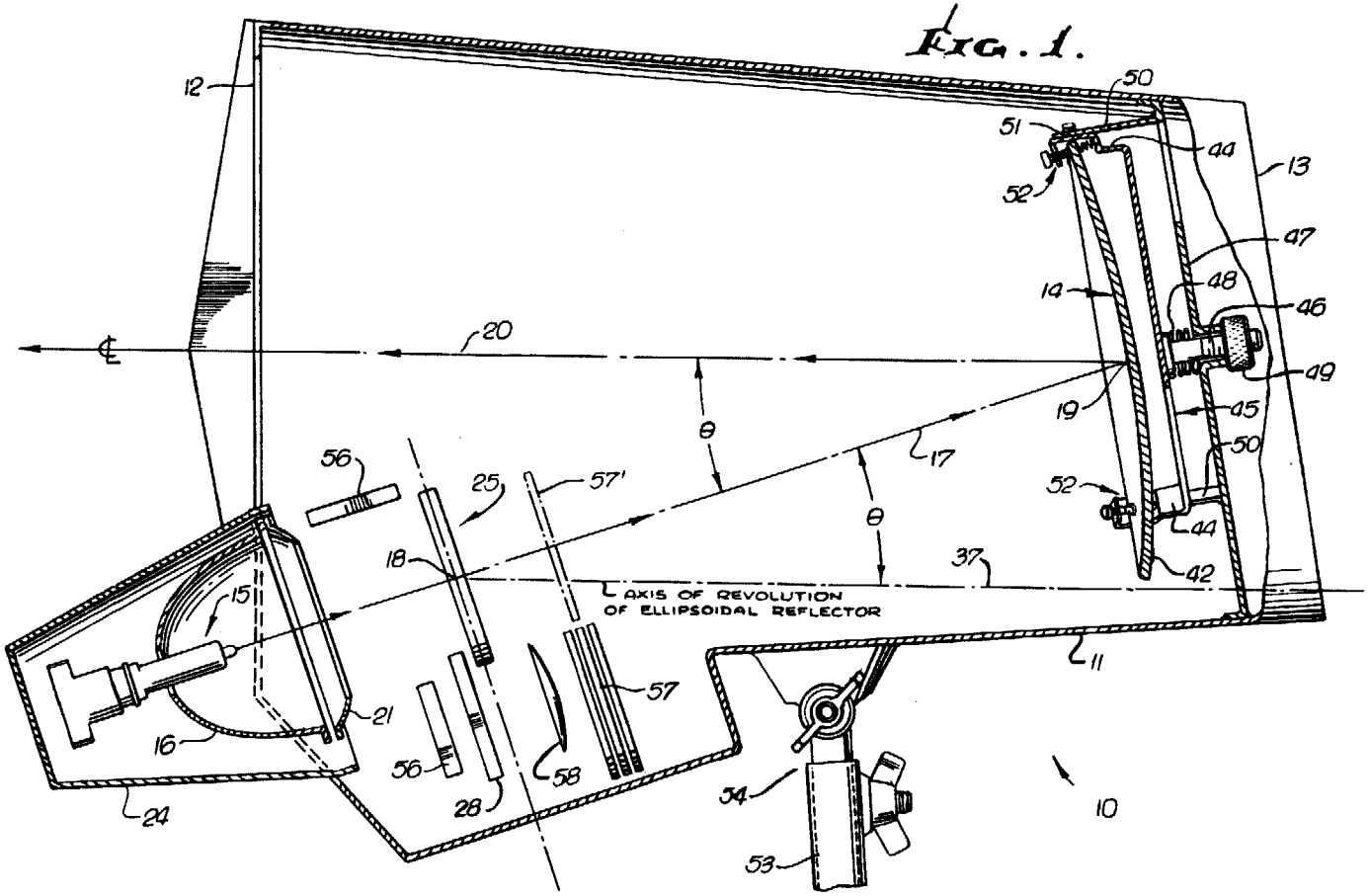
FIG. 1 is a transverse sectional view of a compact follow spotlight in accordance with the present invention.
Figure 2:
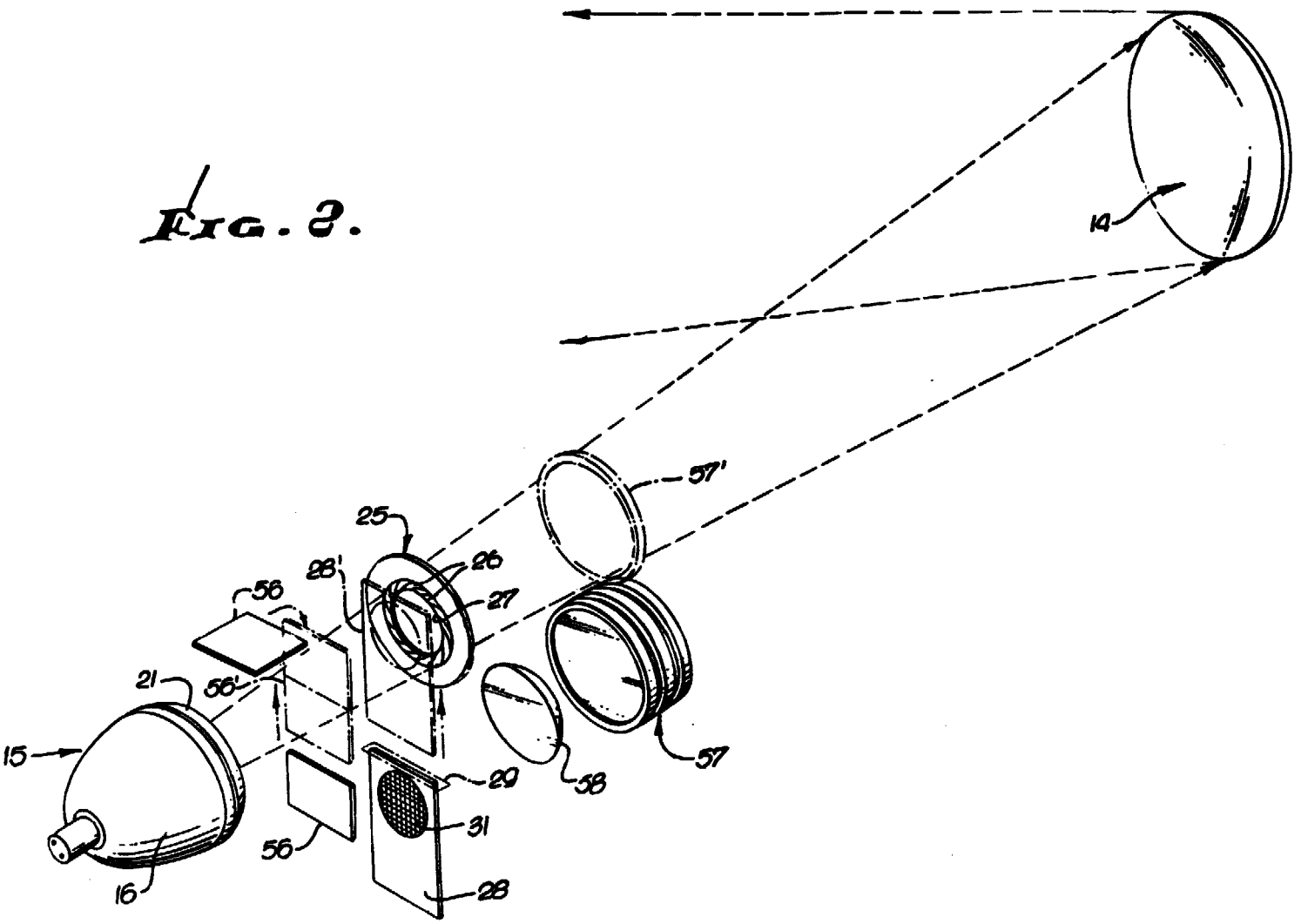
FIG. 2 is a diagrammatic view of the principal components of the follow spot shown in FIG. 1.

Referring now to FIGS. 1 and 2, the inventive compact follow spotlight 10 includes a housing 11 that has an open front end 12. Mounted within the housing 11 near the rear end 13 is an elliptic mirror 14, the geometric characteristics of which are specified in detail below. Situated near the housing front end 12 is a lamp 15 and an associated elliptical reflector 16 arranged to project light toward the mirror 14. Preferably the central axis 17 of light from the lamp 15 passes through the near focus 18 of the elliptic mirror 14 and impinges at the center 19 of the mirror 14. The mirror 14 is so oriented that reflected light incident along the central axis 17 is reflected out of the spotlight 11 along a line 20 that preferably coincides with the centerline of the housing 11 through the center of the opening 12.

The lamp 15 and reflector 16, of course, produce a cone of light centered about the axis 17. The cone size is limited by an annular reflector 21 situated at the open end of the lamp reflector 16. The reflector 21 also returns otherwise lost light back toward the reflector 16. When reflected by the elliptic mirror 14, the cone of light diverges as it leaves the housing 11, but is focused in a plane 22 (FIG. 3) that coincides with the remote focal point 23 of the elliptic mirror 14. The mirror geometry minimizes astigmatism despite the offset location of the lamp 15. The lamp 15 and reflector 16 are mounted in a holder 24 which itself is attached to or part of the housing 11. As shown in FIG. 1, this holder 24 is near the lower edge of the open front end 12. Importantly, the holder 24 is offset sufficiently from the centerline 20 so as to be substantially out of the path of light reflected from the mirror 14. Light blockage is minimal or avoided entirely.

An iris 25 (FIGS. 1 and 2) is situated in the light path between the lamp 15 and the mirror 14, coincident with the near focus 18. The iris 25 is a conventional item that has a plurality of overlapping opaque leaves 26 that define a circular opening 27 (FIG. 2) of adjustable size. As a result of the focusing action of the elliptic mirror 14, an image of the iris opening 27 is projected in the remote focal plane 22. The geometry and orientation of the mirror 14 is such that astigmatism of the projected image is minimized. For theatrical applications, this means that the projected spot will be circular.

Figure 3:
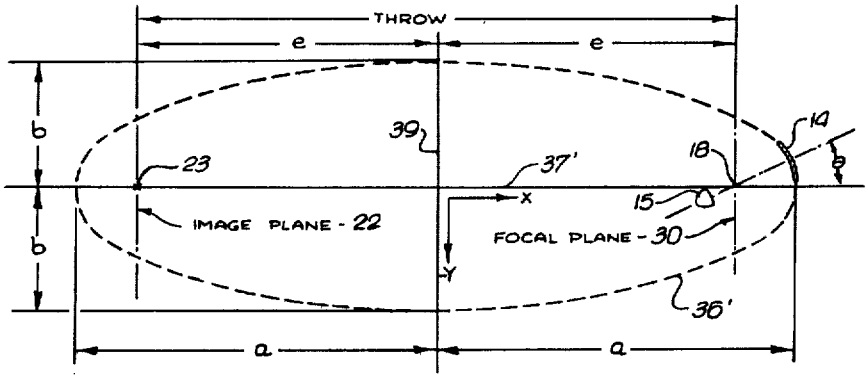
FIG. 3 is a diagram showing the geometry of the elliptical reflective optics used in the follow spot of FIG. 1.

Of course, other shapes may be desired for the projected light, and this is facilitated by a pattern matte or mask 28 which can be inserted through a gate 29 into the light path as shown in phantom at 28' in FIG. 2. The matte 28 is situated sufficiently close to the iris 25, and to the near focal plane 30 through the focus 18, so that the projected image of the pattern 31 will be in focus at the distant image plane 22 (FIG. 3).

Figure 4:
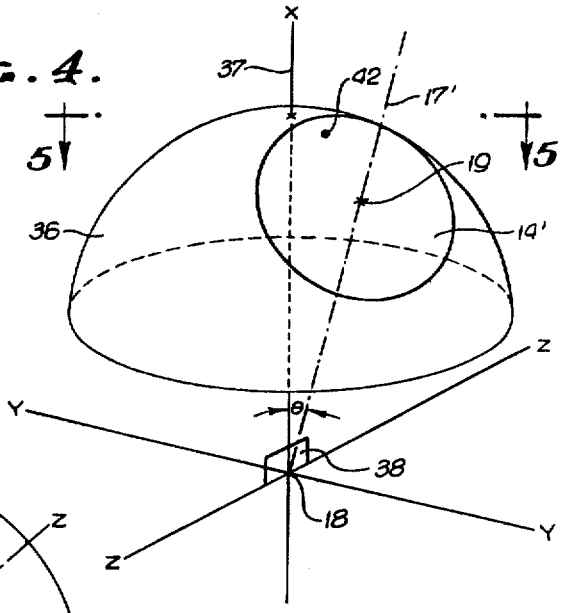
FIG. 4 is a pictorial view, partly diagrammatic, showing the ellipsoid of revolution from which is formed the mirror utilized in the follow spot of FIG. 1.
Figure 5:
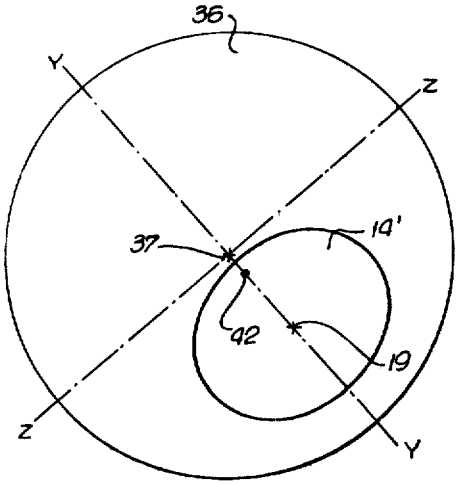
FIG. 5 is an end view of the ellipsoid of revolution as viewed along the line 5—5 of FIG. 4.

The reflecting surface of the mirror 14 comprises a [section] *segment* 14' of [an ellipsoid of revolution] *a revolved conic section* 36 (FIGS. 4 and 5) *having a near focus and a far focus on the same side and* which is generated by revolving *the conic section in this instance* an ellipse 36' (FIG. 3) about an axis of revolution 37 corresponding to the ellipse major axis 37'. The mirror [section] *segment* 14' is offset to one side of a meridian plane 38 that includes the axis of revolution 37. In the coordinate system of FIGS. 3, 4 and 5, this meridian plane corresponds to the X–Z plane (with Y=0). The mirror [section] *segment* 14' is generally circular when viewed along the line 17' between the focus 18 and the center 19 of the [section] *segment.*

The ellipsoid 36 parameters are established by spotlight design criteria. Thus the desired "throw", i.e., the distance from the follow spot 10 that the light is focused, determines the length 2e between the foci 18 and 23. The angular offset $\theta$ of the light source 15 and the distance U between the iris 25 (in the focal plane 30) and the mirror 14 are dimensions of choice. Since $U=(a-e)\sin\theta$, these parameters establish the major axis length 2a of the ellipse 36'. Another design choice is the desired magnification, i.e., the size ratio between the iris opening 27 and the projected light image. The approximate magnification M is given by:

$$M \cong \frac{2a}{(a-e)}$$

The diameter of the mirror 14 likewise is a design choice, and will depend in part on the size of the light cone from the lamp 15 and the reflectors 16 and 21.

By way of example only, a practical follow spot having a throw of about 75 feet may have the following parameters:

| | |
|---|---|
| $\theta = 19°$ | mirror diameter = 12 inches |
| U = 19 inches | magnification = 48 |
| a = 38.3 feet | |
| e = 36.7 feet | |
| b = 10.8 feet | |
| $\epsilon = 0.96$ | |

Such a follow spot readily may be constructed in a housing 11 having an overall length of about two feet, almost half the size of a conventional follow spot of like throw and magnification.

In the follow spot 10 of FIGS. 1 and 2, the mirror 14 comprises a [section] *segment* 14' lying entirely on one side of the meridian plane of a front-aluminized glass shell 36 in the shape of the defined ellipsoid of revolution. The mirror 14 is mounted within the housing 11 so that an identification point 42 (FIG. 5) on the [section] *segment* 14', in a line between the center 19 and the axis of revolution 37, has the same angular orientation with respect to the opening 12 as does the light source 15. In other words, if the lamp 15 is situated at the bottom of the housing 11, the point 42 likewise will be at the bottom of the housing 11. This insures that the geometry illustrated in FIG. 3 will be maintained in the actual follow spot 10, resulting in a projected image free of astigmatism. Thus even though the circular iris 25 image is projected onto the mirror 14 from a position offset from the centerline 20, the characteristics of the elliptic mirror 14 will result in a circular image at the distant focal plane 22.

Some adjustment of the "throw" or distance to the projected image is desirable. To this end, the mirror 14 advantageously is mounted to permit limited back and forth movement, parallel to a normal 43 to the mirror center 19, without angular rotation of the mirror. Accordingly, the mirror 14 is secured at its periphery by the legs 44 of a bracket 45 having at its center a rearwardly extending, threaded boss 46. The boss 46 extends through a rigid mounting bracket 47 affixed to the housing 11. A compression spring 48 biases the mirror 14 toward the front end 12 of the housing 11. However, forward motion is prevented by a knurled nut 49, threaded to the boss 46, that engages the bracket 47. If the nut 49 is loosened, the force of the spring 48 will move the mirror 14 forward. If the nut 49 is tightened, the mirror will move rearwardly. Rotation of the mirror 14 is prevented by guides 50 extending from the bracket 47 into holes 51 in the bracket 45. Alternately, the mirror 14 may be moved linearly parallel to the light beam center axis 17, also resulting in a change of "throw" distance. The mirror 14 itself preferably is mounted at three peripheral points, separated by 120°, by means of spring loaded supports 52 that permit fine adjustment of the mirror alignment.

Advantageously, the housing 11 is attached to a support 53 by means of a pivotal joint 54 that permits the follow spot 10 to be pivoted about either the horizontal or vertical axis. When the follow spot 10 is tilted downward, the opening in the reflector 21 is higher than the lamp 15, thereby permitting natural draft ventilation of the lamp. This is in contradistinction to prior art follow spots in which the lamp opening pointed in the same direction as the housing, so that when tilted downward, heat from the lamp would be trapped by the reflector.

Various accessories may be interposed in the light path from the lamp 15 to the mirror 14. Thus as shown in FIG. 2, the follow spot 10 is provided with a pivoting shutter 56 that can be inserted in front of the lamp 15 (as shown in phantom at 56') to block the light entirely. A set of color filters 57 also may be provided. One or more of these can be interposed in the light path (as shown in phantom at 57') to obtain a colored spot. A flood or spread lens 58 also may be employed to increase the effective magnification in one or both image axes. In the drawings the lamp 15, and the various accessories are shown at the bottom of the housing 11. However, this is not required. These items could be situated near the top of the housing, and thus permit easier operator access to the iris, shutter and filter controls.

Intending to claim all novel, useful and unobvious features shown or described, the applicant claims:

1. A compact follow spotlight comprising:

a housing having one end that is optically transparent, an elliptic mirror mounted within said housing near the other end thereof, the reflecting surface of said mirror comprising a [section] *segment* of an ellipsoid of revolution, said [section] *segment* being offset to one side of a meridian plane including the axis of revolution of said ellipsoid, and a light source mounted within said housing near said one end remote from the near focus of said ellipsoid of revolution and offset to one side thereof so as to be substantially out of the path of light reflected from said mirror, said light source being arranged to project light past an object to be imaged placed at the near focus of said ellipsoid of revolution and toward said mirror, light from said source being reflected by said mirror through said transparent end and focused by said elliptic mirror in a distant focal plane coinciding with the far focus of said ellipsoid of revolution.

2. A follow spotlight according to claim 1 wherein said light source comprises a lamp and an associated reflector for projecting a beam of light toward said elliptic mirror, the central axis of the light beam from said lamp passing through the near focus of said ellipsoid of revolution and impinging on said mirror near the center thereof.

3. A follow spotlight according to claim 1, wherein said object to be imaged comprises an iris interposed in the light path between said source and said mirror at said near focus.

4. A follow spotlight according to claim 2 wherein said mirror is angularly oriented within said housing so that the peripheral point of said mirror [section] *segment* nearest said ellipsoid axis of revolution is in a plane including said near focus and the central axis of light reflected from said mirror, on the same side of said housing as said source.

5. A follow spotlight according to claim 2 wherein said mirror [section] *segment* subtends an angle of about twice the angle between said light beam central axis and said ellipsoid axis of revolution.

6. A follow spotlight according to claim 1, wherein said mirror is mounted for limited linear movement, without rotation, parallel to a normal through the center of said mirror, said limited movement permitting adjustment of the focus of said spotlight for different throw distance.

7. A follow spotlight according to claim 2, wherein said mirror is mounted for limited linear movement, without rotation, parallel to said light beam central axis, said limited movement permitting adjustment of the focus of said spotlight for different throw distance.

8. A follow spotlight according to claim 2 wherein said lamp-associated reflector is elliptic, and wherein said light source includes an annular reflector at the open end of said lamp-associated reflector for limiting the size of said light beam so that said beam is completely encompassed by said mirror, and further comprising a pattern mask interposable in said light beam adjacent the near focal plane of said ellipsoid of revolution.

9. A follow spotlight according to claim 8 further comprising a mounting for said housing that permits both vertical and axial pivoting of said housing, and wherein said housing one end is open and said light source is mounted near the bottom of said housing open end, so that when the housing one end is pivoted downward, heat from said lamp will rise through said annular reflector and through said open end to accomplish draft ventilation of said lamp.

10. A follow spotlight according to claim 2 further comprising a flood or spread lens interposed in the light path between said source and said mirror to increase the effective magnification of the spotlight image.

11. A light projection system comprising:

an elliptic reflector, the reflective surface of which is a [section] *segment* of an ellipsoid of revolution on one side of a meridian plane of said ellipsoid, and a light source situated in front of said reflector and remote from the near focus thereof for directing a beam of light onto said reflector through said near focus, said reflector thereby projecting an image, focused in the remote focal plane of said ellipsoid, of an object situated in the path of said beam at the near focal plane of said ellipsoid, said light source being offset to one side of said reflector so as to be substantially out of the path of light reflected from said elliptic reflector.

12. A theatrical follow spot comprising the light projection system according to claim 11 together with a pivotally mounted housing containing said light projection system and an iris situated in the path of said beam at said near focal plane of said ellipsoid.

13. A follow spot according to claim 11 wherein said reflective surface is the front surface of said reflector, said light projecting system thus being characterized by a single reflective surface.

14. A light projection system comprising an elongated housing having one open end, an ellipsoidal mirror mounted within said housing opposite said open end, the reflecting surface of said mirror comprising a [section] *segment* of an ellipsoid of revolution, said [section] *segment* being offset to one side of a meridian plane including the axis of revolution of said ellipsoid, light source means comprising an elliptical reflector for projecting a beam of light, means for mounting said light source means within said elongated housing adjacent said open end, offset to one side thereof and remote from the near focus of said ellipsoidal mirror so as to direct said beam of light through said near focus onto said ellipsoidal mirror, and, iris means interposed in said beam of light at said near focus, whereby an image of said iris means is caused to focus in the far focal plane of said ellipsoidal mirror.

15. The light projection system of claim 14, further comprising means for mounting said ellipsoidal mirror for linear movement parallel to the central axis of said beam of light whereby the throw of said system may be adjusted.

16. The light projection system of claim 15, further comprising an annular reflector means mounted about the open end of said elliptical reflector for selectively limiting the size of said beam of light.

*17. A compact follow spotlight comprising:*

*housing having one end that is optically transparent, a projecting mirror mounted within said housing near the other end thereof, the reflecting surface of said mirror comprising an offset segment of a revolved conic section having a near focus and a distant focus both on the same side of the mirror,*

*a light source mounted within said housing near said one end remote from the near focus of said revolved section and offset to one side thereof so as to be substantially out of the path of light reflected from said mirror, said light source being arranged to project light past an object to be imaged placed at said near focus of said revolved section and toward said mirror, light from said source being reflected by said mirror through said transparent end and focused by said mirror in a distant focal plane.*

*18. A follow spotlight according to claim 17 wherein said light source comprises a lamp and an associated reflector for projecting a beam of light toward said mirror, the central axis of the light beam from said lamp passing through the near focus of said revolved section and impinging on said mirror near the center thereof.*

*19. A follow spotlight according to claim 17 wherein said object to be imaged comprises an iris interposed in the light path between said source and said mirror at said near focus.*

*20. A follow spotlight according to claim 18 wherein said mirror is angularly oriented within said housing so that the peripheral point of said mirror section nearest said axis of revolution is in a plane including said near focus and the central axis of light reflected from said mirror, on the same side of said housing as said source.*

*21. A follow spotlight according to claim 17 wherein a plurality of shutters interposed in the light path between said source and said mirror to comprise said object to be imaged; and means to move said shutters into operative position at said near focal plane.*

*22. A follow spotlight according to claim 17 wherein said mirror is mounted for limited linear movement, without rotation, parallel to a normal through the center of said mirror, said limited movement permitting adjustment of the focus of said spotlight for different throw distance.*

*23. A follow spotlight according to claim 18 wherein said mirror is mounted for limited linear movement, without rotation, parallel to said light beam central axis, said limited movement permitting adjustment of the focus of said spotlight for different throw distance.*

*24. A follow spotlight according to claim 18 wherein said lamp-associated reflector is elliptic, and wherein said light source includes an annular reflector at the open end of said lamp-associated reflector for limiting the size of said light beam so that said beam is completely encompassed by said mirror, and further comprising a pattern mask interposable in said light beam to the near focal plane of said revolved section.*

*25. A follow spotlight according to claim 24 further comprising a mounting for said housing that permits both vertical and axial pivoting of said housing, and wherein said housing one end is open and said light source is mounted near the top of said housing open end, so that when the housing one end is pivoted downward, heat from said lamp will rise through said annular reflector and through said open end to accomplish draft ventilation of said lamp.*

*26. A follow spotlight according to claim 18 further comprising a flood or spread lens interposed in the light path between said source and said mirror to increase the effective magnification of the spotlight image.*

*27. A light projection system comprising:*

*a reflector, the reflective surface of which is an offset segment of a revolved conic section having a near focus and a remote focus both on the same side of the mirror,*

*a light source situated in front of said reflector and remote from the near focus thereof for directing a beam of light onto said reflector through said near focus, said reflector thereby projecting an image focused in a remote focal plane of an object situated in the path of said beam at the near focal plane of said section, said light source being offset to one side of said reflector so as to be substantially out of the path of light reflected from said reflector.*

*28. A theatrical follow spot comprising the light projection system according to claim 27 together with a pivotally mounted housing containing said light projection system and an iris situated in the path of said beam at said near focal plane of said revolved conic section.*

*29. A follow spot according to claim 27 wherein said reflective surface is the front surface of said reflector, said light projecting system thus being characterized by a single reflective surface.*

*30. A light projection system comprising an elongated housing having one open end, a projecting mirror mounted within said housing opposite said open end, the reflecting surface of said mirror comprising an offset segment of a revolved conic section, having a near focus and a far focus both on the same side of the mirror,*

*light source means comprising an elliptical reflector for projecting a beam of light,*

*means for mounting said light source means within said elongated housing adjacent said open end, offset to one side thereof and remote from the near focus of said mirror so as to direct said beam of light through said near focus onto said projecting mirror, and*

*iris means interposed in said beam of light at said near focus, whereby an image of said iris means is caused to focus in a far focal plane of said mirror.*

*31. The light projection system of claim 30 further comprising means for mounting said mirror for linear movement parallel to the central axis of said beam of light whereby the focus of said system may be adjusted.*

*32. A light projecting system of claim 30 comprising means for mounting said iris for linear movement parallel to the central axis of said beam of light from said light source whereby the focus of said system may be adjusted.*

* * * * *